(12) United States Patent
Ryan

(10) Patent No.: US 12,181,600 B2
(45) Date of Patent: Dec. 31, 2024

(54) DETERMINING DISTANCE BETWEEN TWO RADIO TRANSCEIVERS

(71) Applicant: Nordic Semiconductor ASA, Trondheim (NO)

(72) Inventor: Daniel Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 510 days.

(21) Appl. No.: 17/538,826

(22) Filed: Nov. 30, 2021

(65) Prior Publication Data

US 2022/0171020 A1 Jun. 2, 2022

(30) Foreign Application Priority Data

Dec. 1, 2020 (GB) ...................................... 2018918

(51) Int. Cl.
*G01S 7/285* (2006.01)
*G01S 5/02* (2010.01)
*G01S 13/82* (2006.01)

(52) U.S. Cl.
CPC ............ *G01S 7/285* (2013.01); *G01S 5/0221* (2013.01); *G01S 13/82* (2013.01)

(58) Field of Classification Search
CPC . H04W 56/00; H04W 56/0045; H04W 84/18; G01S 7/285; G01S 5/0221; G01S 13/82; H04J 3/0682; H04L 7/042

(Continued)

(56) References Cited

U.S. PATENT DOCUMENTS

| 11,877,233 B1 * | 1/2024 | Bloechl .................... G01S 5/14 |
| 2007/0200759 A1 * | 8/2007 | Heidari-Bateni ..... G01S 13/767 342/458 |

(Continued)

FOREIGN PATENT DOCUMENTS

| CN | 102027681 A | 4/2011 | |
| CN | 203299175 U * | 11/2013 | ............. G01N 29/22 |

(Continued)

OTHER PUBLICATIONS

Steven Lanzisera et al., Radio Frequency Time-of-Flight Distance Measurement for Low-Cost Wireless Sensor Localization, IEEE Sensors Journal, vol. 11, No. 3, Mar. 2011. (Year: 2011).*

(Continued)

*Primary Examiner* — Peter G Solinsky
*Assistant Examiner* — Sanjay K Dewan
(74) *Attorney, Agent, or Firm* — Klarquist Sparkman, LLP

(57) ABSTRACT

A method for determining a distance between an initiator radio transceiver and a reflector radio transceiver is provided. The method comprises the initiator radio transceiver transmitting a first radio signal at a first transmission time and the reflector radio transceiver receiving the first radio signal at a first reception time. The reflector transceiver samples the first radio signal using a sampling clock signal having a sampling period and determines a first reception-time value at a temporal resolution that is finer than the sampling period, including a fractional component representative of a fraction of the sampling period. The reflector transceiver transmits a second radio signal at a second transmission time that is offset from the sampling clock signal by an amount that depends on said fractional component so as to provide a predetermined dwell time that is determined to an accuracy finer than the sampling period.

(Continued)

The initiator radio transceiver receives the second radio signal at a second reception time and determines a distance value representative of a distance between the initiator radio transceiver and the reflector radio transceiver.

19 Claims, 3 Drawing Sheets

(58) Field of Classification Search
USPC .......................................................... 370/350
See application file for complete search history.

(56) References Cited

U.S. PATENT DOCUMENTS

| | | | | |
|---|---|---|---|---|
| 2008/0267304 | A1* | 10/2008 | Chong | H04B 1/7105 |
| | | | | 375/260 |
| 2009/0103516 | A1* | 4/2009 | Miyano | H04W 56/0085 |
| | | | | 375/354 |
| 2009/0149198 | A1* | 6/2009 | Nam | G01S 5/0289 |
| | | | | 455/456.2 |
| 2012/0032855 | A1* | 2/2012 | Reede | G01S 13/82 |
| | | | | 370/252 |
| 2012/0158177 | A1* | 6/2012 | Lee | G05D 1/0278 |
| | | | | 700/248 |
| 2022/0066019 | A1* | 3/2022 | Waheed | G01S 13/84 |
| 2022/0173946 | A1* | 6/2022 | Wu | H03L 7/23 |
| 2022/0330180 | A1* | 10/2022 | Tamma | H04L 69/22 |
| 2022/0369113 | A1* | 11/2022 | Motos | H04L 9/001 |
| 2023/0077766 | A1* | 3/2023 | Mudulodu | H04W 56/0035 |
| | | | | 370/350 |
| 2023/0134036 | A1* | 5/2023 | Larsson | H04W 56/004 |
| | | | | 370/350 |
| 2023/0204745 | A1* | 6/2023 | Sheikh | G01S 13/84 |
| | | | | 370/252 |

FOREIGN PATENT DOCUMENTS

| | | | | |
|---|---|---|---|---|
| CN | 104024878 A | | 9/2014 | |
| CN | 110168396 A | | 8/2019 | |
| DE | 3 315 991 A1 | * | 10/2016 | ............... G01S 5/02 |
| EP | 3 315 991 A1 | | 10/2016 | |
| EP | 3 859 384 A1 | * | 8/2021 | ............. G01S 13/84 |
| GB | 2536487 A | * | 3/2015 | ............. G01S 13/74 |
| GB | 2536487 | | 9/2016 | |

OTHER PUBLICATIONS

Office Action issued in China Application No. 202111453713.X, dated Feb. 5, 2024, 9 pages.

IPO Search Report under Section 17(5) for GB2018918.9, mailed May 14, 2021, 3 pages.

Lanzisera et al., "Radio Frequency Time-of-Flight Distance Measurement for Low-Cost Wireless Sensor Localization," *IEEE Sensors Journal*, vol. 11, No. 3, Mar. 2011, pp. 837-845.

* cited by examiner

DETERMINING DISTANCE BETWEEN TWO RADIO TRANSCEIVERS

CROSS-REFERENCE TO RELATED APPLICATION

This application claims priority to United Kingdom Patent Application No. GB2018918.9, filed Dec. 1, 2020, which application is incorporated herein by reference in its entirety.

BACKGROUND OF THE INVENTION

This invention relates to apparatus and methods for determining the distance between two radio transceivers.

Radio waves travel through media such as air, space and water at speeds that are relatively constant and precisely known. This means that the time it takes a radio signal to travel from a radio transmitter to a radio receiver corresponds to the separation distance between them. If this time can be measured accurately, the distance can thus be determined with corresponding accuracy. If the transmitter and receiver have accurately synchronized clocks, a single one-way transmission may be sufficient to determine a distance between them. However, in many situations, radio transceivers will not have clocks that are synchronized with sufficient accuracy or that are not synchronized at all.

Round-trip timing (RTT) can be used to determine the separation distance between two digital radio transceivers, even when they do not have access to a common time reference. RTT is based on the measurement of the time for a first timing signal to travel from a transceiver device A (an "initiator") to a transceiver device B (a "reflector") and for a second timing signal to travel from device B back to device A. If the interval from device B receiving the first signal and transmitting the second signal (i.e. the "dwell time" of device B) is known to device A, then device A can calculate the average time of flight (TOF) by subtracting the time of transmission of the first signal (measured according to the clock of device A) plus the dwell time from the time of reception of the second signal (also measured according to the clock of device A), and dividing by two.

However, the accuracy of this TOF calculation is conventionally limited by the resolution of the sampling clocks used by the radio transceivers of the two radio devices. Providing the radio devices with higher-frequency sampling clocks, to improve the timing resolution, can be costly and can result in higher power consumption.

Embodiments of the present invention seek to provide a different approach to determining distance more accurately without having to increase the sampling clock rates.

SUMMARY OF THE INVENTION

From a first aspect, the invention provides a method for determining a distance between an initiator radio transceiver and a reflector radio transceiver, the method comprising:
the initiator radio transceiver transmitting a first radio signal at a first transmission time;
the reflector radio transceiver:
  receiving the first radio signal at a first reception time;
  generating an electrical signal representative of the received first radio signal;
  generating a sampled signal by sampling the electrical signal using a sampling clock signal having a sampling period;
  processing the sampled signal to determine a first reception-time value, representative of the first reception time, at a temporal resolution that is finer than the sampling period, whereby the first reception-time value comprises a fractional component representative of a fraction of the sampling period; and
  using the fractional component to transmit a second radio signal at a second transmission time that is offset from the sampling clock signal by an amount that depends on said fractional component, such that the second transmission time is delayed from the first reception time by a predetermined dwell time that is determined to an accuracy finer than the sampling period; and
the initiator radio transceiver:
  receiving the second radio signal at a second reception time;
  determining a second reception-time value representative of the second reception time; and
  processing the second reception-time value and a first transmission-time value representative of said first transmission time to determine a distance value representative of a distance between the initiator radio transceiver and the reflector radio transceiver.

From a second aspect, the invention provides a reflector radio transceiver for use in a method for determining a distance between an initiator radio transceiver and the reflector radio transceiver, wherein the reflector radio transceiver is configured to:
  receive a first radio signal from the initiator radio transceiver at a first reception time;
  generate an electrical signal representative of the received first radio signal;
  generate a sampled signal by sampling the electrical signal using a sampling clock signal having a sampling period;
  process the sampled signal to determine a first reception-time value, representative of the first reception time, at a temporal resolution that is finer than the sampling period, whereby the first reception-time value comprises a fractional component representative of a fraction of the sampling period; and
  use the fractional component to transmit a second radio signal at a second transmission time that is offset from the sampling clock signal by an amount that depends on said fractional component, such that the second transmission time is delayed from the first reception time by a predetermined dwell time that is determined to an accuracy finer than the sampling period.

From a third aspect, the invention provides a radio system comprising an initiator radio transceiver and a reflector radio transceiver, wherein:
the initiator radio transceiver is configured to transmit a first radio signal at a first transmission time;
the reflector radio transceiver is configured to:
  receive the first radio signal at a first reception time;
  generate an electrical signal representative of the received first radio signal;
  generate a sampled signal by sampling the electrical signal using a sampling clock signal having a sampling period;
  process the sampled signal to determine a first reception-time value, representative of the first reception time, at a temporal resolution that is finer than the sampling period, whereby the first reception-time value comprises a fractional component representative of a fraction of the sampling period; and use the fractional component to transmit a second radio signal at a second transmission time that is offset from the sampling clock signal by an amount that depends on said fractional component, such that the second transmission time is delayed from the first reception time by a predetermined dwell time that is determined to an accuracy finer than the sampling period; and the initiator radio transceiver is further configured to:
receive the second radio signal at a second reception time;
determine a second reception-time value representative of the second reception time; and
process the second reception-time value and a first transmission-time value representative of said first transmission time to determine a distance value representative of a distance between the initiator radio transceiver and the reflector radio transceiver.

From a fourth aspect, the invention provides computer software comprising instructions that, when executed by a processing system of a reflector radio transceiver, cause the processing system to:

receive a sampled signal representative of a received first radio signal received by the reflector radio transceiver at a first reception time, wherein the sampled signal is sampled according to a sampling clock signal having a sampling period;

process the sampled signal to determine a first reception-time value, representative of the first reception time, at a temporal resolution that is finer than the sampling period, whereby the first reception-time value comprises a fractional component representative of a fraction of the sampling period; and use the fractional component to control the reflector radio transceiver to transmit a second radio signal at a second transmission time that is offset from the sampling clock signal by an amount that depends on said fractional component, such that the second transmission time is delayed from the first reception time by a predetermined dwell time that is determined to an accuracy finer than the sampling period.

Thus it will be seen that, in accordance with the invention, the reflector transceiver can implement a dwell time with a timing accuracy that is finer than the reflector's sampling clock rate—i.e. with sub-cycle accuracy. This may then enable the initiator transceiver to measure the round-trip time for the first and second signals more accurately than would otherwise be possible, by eliminating the uncertainty, of up to one clock cycle, in the actual dwell time implemented by the reflector compared with the predetermined intended dwell time.

Notably, this approach can also enable the initiator transceiver to determine a distance value without any timing information having to be transmitted from the reflector transceiver to the initiator transceiver. This is possible because the dwell time is predetermined, so can be known in advance by the initiator—e.g. being fixed by design specification for the system as a constant for all instances of the method, or having been previously negotiated or agreed between the transceivers for one or more instances. This can avoid the need for any further communication between the transceivers, other than the first and second signals, thereby desirably minimising the radio bandwidth required for the distance determining method (although such communication is not, of course, prohibited from occurring in some embodiments). In this way, the method can be both quick and power efficient.

The reflector may comprise a digital-to-analog converter (DAC) that is clocked by the sampling clock signal, for sampling received radio signals. The reflector may also comprise an analog-to-digital converter (ADC) that is clocked by the sampling clock signal, for converting digital signals to analog signals for transmission as radio signals.

The reflector may use any suitable technical to determine the first reception-time value at a temporal resolution that is finer than the sampling period. In some embodiments, the reflector comprises a digital correlator, which may be implemented in hardware or software. The correlator may be configured to cross-correlate the sampled signal with reference data representative of part or all of the first radio signal (e.g. a known 32 or 64 bit sequence encoded in the radio signal). The reflector may process an output of the correlator, in hardware or software, to determine the first reception-time value—e.g. by determining the location of a correlation peak with a resolution finer than the sampling clock. In particular, it may be configured to apply a timing-offset determination method to determine the fractional component from the output of the correlator, such as an early-late algorithm, or the Gardner algorithm, or any other suitable algorithm.

The first reception-time value, including the fractional component, may be stored as data in a memory of the reflector.

How the reflector uses the fractional component to control the transmission of the second radio signal may vary between embodiments.

In a first set of embodiments, the reflector radio transceiver comprises a fractional delay filter, which may be implemented in hardware or software. The fractional delay filter may be arranged to introduce a delay to the transmission of the second radio signal of less than one sampling period. The fractional delay filter may be a linear interpolation filter, a windowed-sinc filter, a polynomial interpolation filter, or any other fractional delay filter. In some embodiments, it is a linear interpolation filter, which may be desirable for ease of implementation. The reflector may be configured to control the fractional delay filter in dependence on the factional component. It may be configured to cause the fractional delay filter to implement a delay that is equal to the fractional component or that is a predetermined function of the fractional component.

In a second set of embodiments, the reflector radio transceiver comprises a memory for storing digital template data representing part or all of the second radio signal at a plurality of different fractional delays. Some of the template data may represent a zero delay. The respective fractional delays for the template data may be spaced at equal intervals over one sampling period. In one set of embodiments, the data comprises a plurality of digital signal templates, each representing the whole second radio signal at a different respective fractional delay. There may be any number of templates stored in the memory—e.g. 32 or 64 templates. In another set of embodiments, the data comprises elements for assembling the second radio signal (e.g. samples representing a half-bit duration) and the reflector may be configured to use the template data to calculate the second radio signal on an element-by-element basis (e.g. a half-bit-by-half-bit basis). This may be useful when the first and second radio signals are modulated digital signals that are subject to inter-symbol interference. The reflector may be configured to select template data (e.g. select a template from a plurality of digital signal templates) in dependence on the factional component. It may be configured to select template data having a fractional delay that is closest to the fractional component or that is closest to a predetermined function of the fractional component. The reflector may use the selected template data for transmitting the second radio signal—e.g. by inputting the selected template to a digital-to-analog convertor of the reflector, clocked by the sampling clock.

It will be appreciated that, in some instances, the fractional component may be determined to be zero, and the second radio signal may, in some embodiments, then be transmitted at a zero offset from the sampling clock signal. However, the reflector is always configured to determine (e.g. measure) the fractional component, even when it is zero. Moreover, the reflector is always configured for determining non-zero fractional components whenever these occur.

The second transmission time may follow a pulse of the clock signal by an offset amount that is less than one sampling period. The offset amount may equal the fractional component. This may be appropriate when, as in some embodiments, the predetermined dwell time is an integer multiple of the sampling period.

However, in some embodiments, the offset amount may equal the fractional component plus an adjustment factor, which may be positive or negative. This may be appropriate when, as in some embodiments, the predetermined dwell time is not an integer multiple of the sampling period. A non-integer dwell time may occur by design if the predetermined dwell time is defined or specified to have a duration that is not an integer multiple of the nominal sampling period of the reflector clock signal. A non-integer dwell time may be used for compensating for delays in the electrical signal paths within the reflector transceiver—e.g. for a first delay in the electrical signal path between a receive antenna and a DAC or demodulator when receiving the first radio signal, and for a second delay in the electrical signal path between an ADC or modulator and a transmit antenna when transmitting the second radio signal; such delays may be caused by PCB traces, matching network, low-noise amplifier (LNA), mixer, anti-alias filter (AAF), etc. The adjustment factor may, in some embodiments, be constant—e.g. to take account of any constant electrical path delays and/or when using a sampling clock having a nominal frequency that is not an integer fraction of the specified dwell time. However, in other embodiments, the adjustment factor may be variable, and may be controlled by the reflector. It may comprise a predetermined constant component (e.g. to allow for known path delays) and a variable component determined by the reflector, which may be summed. This may be useful if the sampling clock signal is subject to variable drift, such that the sampling period differs from a nominal sampling period by an unpredictable amount, and/or to account for any variation in the electrical signal path delays.

The reflector may be configured to determine the adjustment factor in dependence on a frequency offset of the sampling clock signal, which be an offset from a nominal or reference frequency, or which may be an offset from a frequency of a local oscillator and/or a sampling clock signal of the initiator. It may be configured to determine the frequency offset of the sampling clock signal using one or more received radio signals. In some embodiments, the reflector comprises a local oscillator, for down-mixing received radio-frequency signals, which may be synchronized to the sampling clock signal. The reflector may determine a frequency offset in the sampling clock by determining a frequency offset between the local oscillator and a received radio signal (which may comprise the first radio signal).

The reflector radio transceiver may comprise one or more radio antennas. The first reception time may be a time at which the first radio signal is received by an antenna of the reflector radio transceiver. The second transmission time may be a time at which the second radio signal is transmitted by an antenna of the reflector radio transceiver.

The initiator radio transceiver may be configured to:
generate a second electrical signal representative of the received second radio signal;
generate a second sampled signal by sampling the second electrical signal using a second sampling clock signal having a second sampling period; and
determine the second reception-time value at a temporal resolution that is finer than the second sampling period, whereby the second reception-time value comprises a fractional component representative of a fraction of the second sampling period.

The initiator may use any suitable technical to determine the second reception-time value at a temporal resolution that is finer than the sampling period. It may comprise a digital correlator, similarly to that described above for the reflector.

In this way, the accuracy of the distance value may be further enhanced by avoiding one-cycle uncertainty in the second reception time.

The initiator radio transceiver may be further configured to determine the first transmission-time value at a temporal resolution that is finer than the second sampling period.

Each of the reception times and transmission times may be determined for any appropriate point in each signal—e.g. for the start of the signal, or for the end of the signal.

The first or second signal may be part of a longer radio transmission, which may include other parts (e.g. preamble data or message data) not used for determining the distance value. The first or second signal may be part or all of a data packet. The first and second radio signals may be modulated digital signals. They may be phase-modulated and/or frequency-modulated and/or amplitude-modulated. In some embodiments, they comprise modulated data. They may be frequency-shift-key (FSK) or Gaussian FSK modulated (GFSK) signals. The data may be a sequence having good autocorrelation properties. It may be a pseudo-random sequence. The data may be constant over multiple instances of the RTT method, or it may vary between instances. Each of the initiator and reflector transceivers may comprise respective hardware or software pseudo-random number generators for generating the same pseudo-random sequence as each other.

The initiator may determine the distance value as the difference between i) the second reception-time value, and ii) the first transmission-time value plus the predetermined dwell time, multiplied by a signal-speed value and divided by two. It may determine the distance value in metres or any other unit of distance. The signal-speed value may represent a speed of the radio signals through a medium such as air. However, it may not be necessary to perform such a calculation in all embodiments—e.g., in some embodiments, the initiator may determine the difference between the i) the second reception-time value, and ii) the first transmission-time value, which may be sufficient for some purposes, since this value may be sufficiently representative of the separation distance between the transceivers for comparison purposes over time (e.g. to detect relative motion of the transceivers towards or away from each other), assuming the dwell time and signal speed remain constant.

The dwell time is preferably constant over multiple instances of the method, although it could vary in some embodiments.

The initiator radio transceiver and the reflector radio transceiver may be implemented as respective radio devices. Each may be all or part of: a radio tag, a sensor device, a cell-phone, a personal computing device, a domestic appliance, a vehicle, or any other device. The transceivers may be separated by any distance. Depending on their communication range, the separation distance could be in the order of centimetres, metres, kilometres, tens of kilometres or more. In some embodiments, the transceivers are respective short-range range devices. They may be respective Bluetooth™ Low Energy radio transceivers. They may support a version of the Bluetooth™ Low Energy protocol. The first and second radio signals may be in a 2.4 GHz band.

The reflector or initiator transceiver may comprise or may be an integrated-circuit radio receiver—e.g., a silicon chip. It may comprise, or be connectable to, one or more off-chip components, such as a power supply, antenna, crystal, discrete capacitors, discrete resistors, etc.

The reflector transceiver may further be configured to implement the steps of an initiator transceiver (in a different instance of the method), and the initiator transceiver may further be configured to implement the steps of the reflector transceiver.

The reflector and initiator transceivers may each comprise one or more processors, DSPs, logic gates, amplifiers, filters, digital components, analog components, non-volatile memories (e.g., for storing software instructions), volatile memories, memory buses, peripherals, inputs, outputs, and any other relevant electronic components or features.

In particular, a processing system configured to process the sampled signal and use the fractional component to control the reflector radio transceiver may be so configured by software instructions stored in a memory of the reflector transceiver. A processing system of the reflector or initiator transceiver may comprise a DSP and/or a general purpose processor, such an Arm™ Cortex-M™ processor. Any of the digital processing steps disclosed herein may be performed wholly in software, or wholly by hardwired circuitry (e.g., comprising digital logic gates), or by a combination or software and hardware.

Computer software disclosed herein may be provided on a non-transitory computer readable medium.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
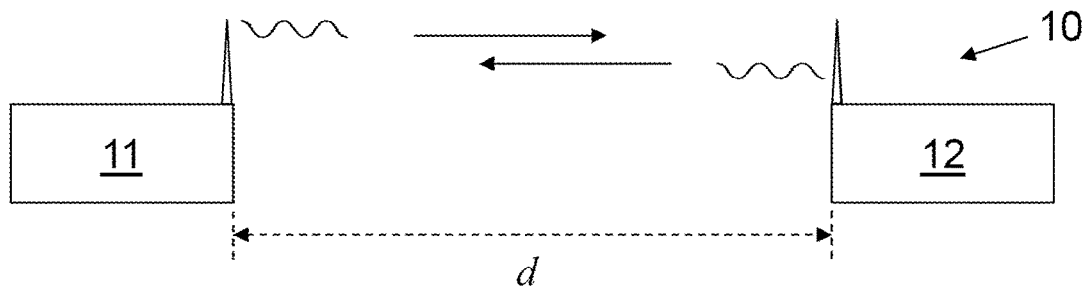
FIG. 1 is a schematic drawing of radio transceiver system, embodying the invention, for measuring separation distance using round-trip timing.

FIG. 1 shows a radio transceiver system 10 comprising a first "initiator" radio transceiver device 11 and a second "reflector" radio transceiver device 12. The devices 11, 12 could be any radio-equipped devices, such as smartphones, wireless sensors, tags, household appliances, land vehicles, satellites, etc. In one set of embodiments, the devices 11, 12 are consumer electronics products that can communicate with each other over a Bluetooth™ Low Energy (BLE) communication link.

The devices 11, 12 are separated by a distance, d. This distance could be of the order of centimetres, metres, kilometres, tens of kilometres, hundreds of kilometres or more, depending on the ranging of the radio communications supported by the devices 11, 12. When using BLE communication, it may be in the order of centimetres or metres.

The devices 11, 12 are configured to cooperate in a radio data-packet communication exchange for measuring the distance d using a round-trip timing (RTT) process. In some embodiments, the devices 11, 12 may optionally also be able to support further processes for distance ranging, such as multicarrier phase-based ranging, which could be used as an alternative to RTT, or in combination with RTT to generate a more accurate measurement.

The devices 11, 12 contain independent clocks for timing their radio transmissions. The clocks are not synchronized with each other.

In a round-trip timing operation, the "initiator" device 11 transmits a first data packet that is received by the "reflector" device 12. The reflector device 12 then transmits a second data packet that is received by the initiator. As explained in more detail below, by measuring the transmission and reception times of these packets, one or both of the devices 11, 12 can estimate the distance, d, between them, making use of the known speed of light, c, at which the radio signals travel between the two devices 11, 12.

Figure 2:
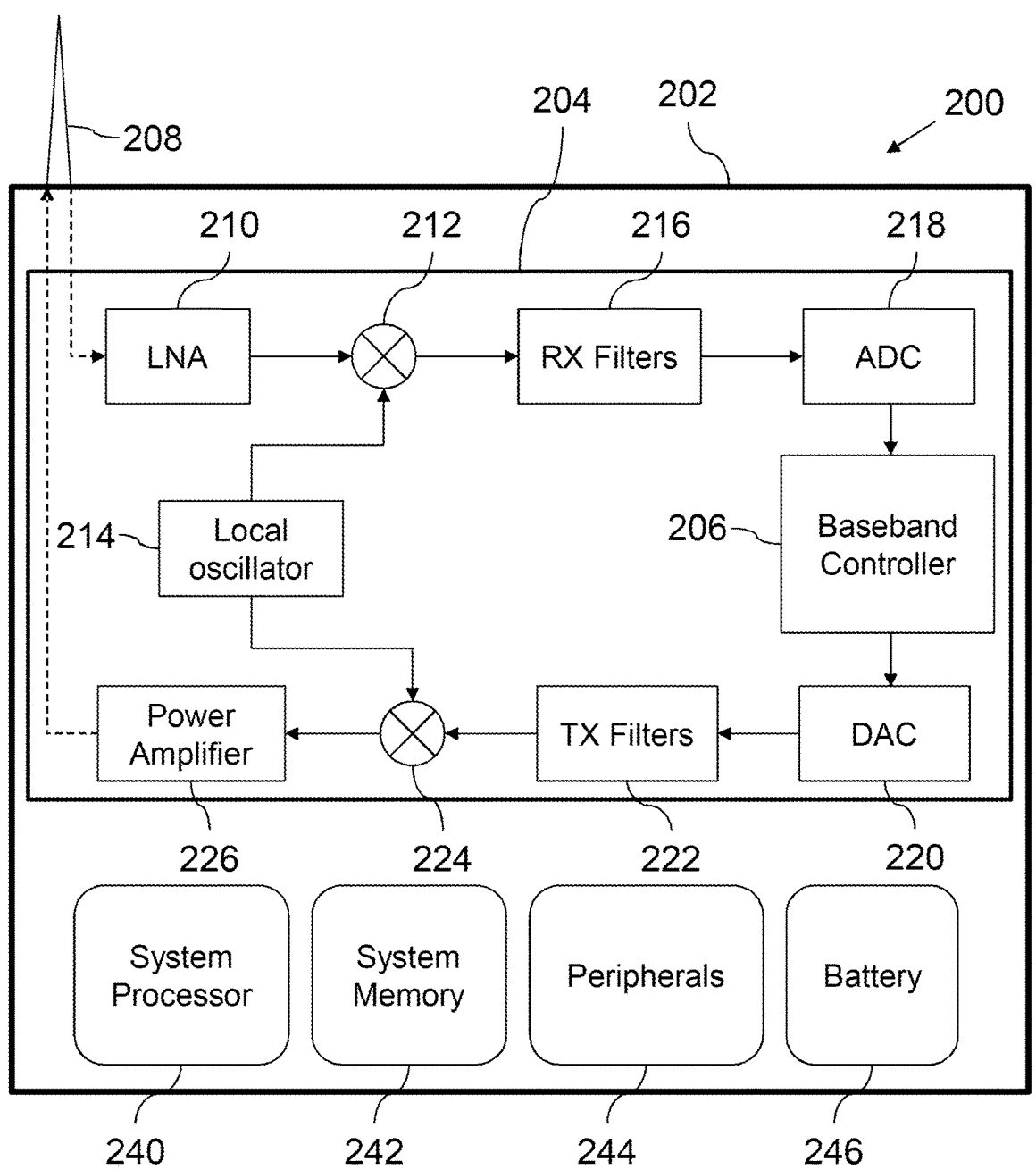
FIG. 2 is a schematic diagram of a single radio transceiver of the system.

FIG. 2 shows the major components of a radio device 200, which could act as the initiator device 11 or as the reflector device 12, in exemplary embodiments. In some systems 10, the initiator and reflector devices 11, 12 may each have all the features of the device 200 shown in FIG. 2, although this is not essential.

The radio device 200 contains, within a housing 202, an integrated-circuit radio transceiver chip 204 that supports Bluetooth™ Low Energy communications. It may additionally support other radio protocols such as IEEE 802.11, 3GPP LTE Cat-M1, 3GPP LTE NB-IoT, IEEE 802.15.4, Zigbee™, Thread™, ANT™, etc.

The radio chip 204 contains a baseband controller 206, which includes dedicated hardware logic, as well as memory for storing software, and a processor for executing the software, such as an Arm™ Cortex™ processor. It may include one or more DSPs or further processors. The baseband controller 206 is connected to one or more radio antennae 208 by a transmit path, for transmitting radio data, and by a receive path, for receiving incoming radio data. The receive path includes a low-noise amplifier (LNA) 210, a quadrature mixer 212 for downmixing an incoming radio-frequency (e.g. 2.4 GHz) signal to an intermediate frequency (IF) or to baseband by mixing the RF signal with a periodic signal generated by a local oscillator 214, a set of analog receive filters 216, and an analog-to-digital converter (ADC) 218. The transmit path includes a digital-to-analog converter (DAC) 220, a set of analog transmit filters 222, a quadrature mixer 224 for up-mixing a baseband signal to a radio frequency (RF) signal using a periodic signal generated by the local oscillator 214, and a power amplifier (PA) 226. The transmit and receive paths may also including components, not shown in FIG. 2, such as RF filtering between the antenna 208 and the LNA 210 or PA 226.

The baseband controller 206 performs digital operations for the transmit and receive paths. On the receive path, it provides digital filtering and GFSK demodulation. On the transmit path, it provides GFSK modulation and digital filtering. It may also perform higher-level operations such as assembling and disassembling data packets, generating and verifying checksums, cryptographic operations, etc. In some embodiments it may implement a full Bluetooth™ Low Energy protocol stack.

When receiving a radio signal, the device 200 down-mixes the incoming RF signal to an intermediate frequency, or to baseband, using the receive mixer 212. It samples the down-mixed signal using the ADC 218 operating at a sampling rate, set by a sampling clock signal, in order to generate a digital representation of the signal. The sampled signal can be digitally filtered and GFSK-demodulated in the baseband controller 206.

When transmitting a radio signal, the baseband controller 206 outputs digital samples representing a GFSK-modulated signal to the DAC 220 at the same sampling rate, set by the sampling clock signal. These are then filtered by the transmission filters 222 and up-mixed by the mixer 224 for transmission.

The chip 204 may optionally include further processors, volatile memory, non-volatile memory, peripherals, or other components, integrated on the same chip as the radio transceiver circuitry, for performing additional functions.

The radio device 200 in this example also contains—separate from the radio chip 204—a system processor 240, system memory 242 (which may include volatile memory (e.g., RAM) and/or non-volatile memory (e.g., flash)), peripherals 244 (such as a temperature sensor or I/O modules), and a battery 246. The radio antennae 208 may be within the housing 202 or external to the housing 202, and may be connected to the radio chip 204 by appropriate components, or may be integrated on the radio chip 204.

The radio device 200 and/or radio chip 204 can contain other components, such as buses, crystals, digital logic, analog circuitry, discrete active components, discrete passive components, further processors, user interface components, etc. which are not shown in FIG. 2 for the sake of simplicity. The radio device 200 may be a component of a larger device, such as a car or a domestic appliance, or it may be a standalone radio device.

In use, software is executed by the baseband controller 206 to perform a round-trip timing (RTT) distance measurement process as disclosed herein.

The radio devices 11, 12 contain complementary software and/or hard-wired logic for carrying out their respective parts of the RTT measurement process. A resulting distance estimate, d, calculated by the initiator device 11 (or by the reflector device 12) may be output to the system processor 240 for further use, or it may be stored or further processed within the radio chip 204.

Each device 11, 12 may transmit a respective timing signal within a radio data packet. In some embodiments, the data packet is Gaussian frequency-shift-key (GFSK) encoded. The data packet may conform to a current or future Bluetooth™ specification. It may be a Bluetooth™ Low Energy (BLE) packet. In other embodiments, it could be a phase-modulated or frequency-modulated or amplitude-modulated packet. The content or shape of each transmitted radio timing signal is known in advance to the receiving device. It may comprise a known bit sequence that is modulated on the radio signal—e.g. a known 32 or 64 bit sequence. The sequence could be constant over repeated RTT operations between the devices 11, 12, and potentially constant over all time. Alternatively, it could be generated afresh by the initiator 11 and reflector 12, from some shared information, for each RTT process or session; for example, it may be a pseudo-random number sequence generated identically by both devices 11, 12 using a commonly-seeded engine, such as an AES cipher engine. The timing signal may occupy the entire data packet, or it may be only a portion of the packet—e.g. being preceded by a packet preamble and/or followed by further elements of the data packet, such as message data.

Each device 11, 12 can determine a time of transmission of a timing signal that it is transmitting. It can also determine a time of reception of a timing signal that it receives. This is described in more detail below.

Figure 3:
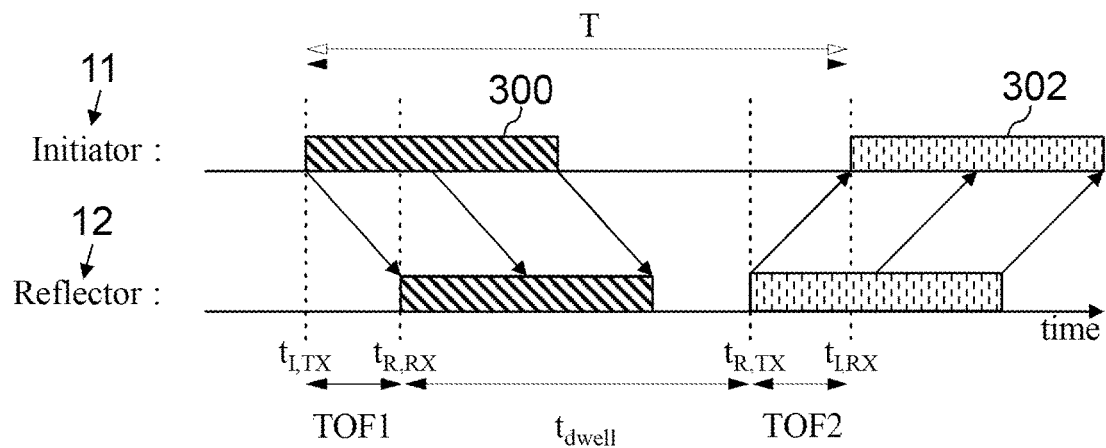
FIG. 3 is a timing diagram giving an overview of a radio packet exchange in the round-trip timing process.
Figure 4:
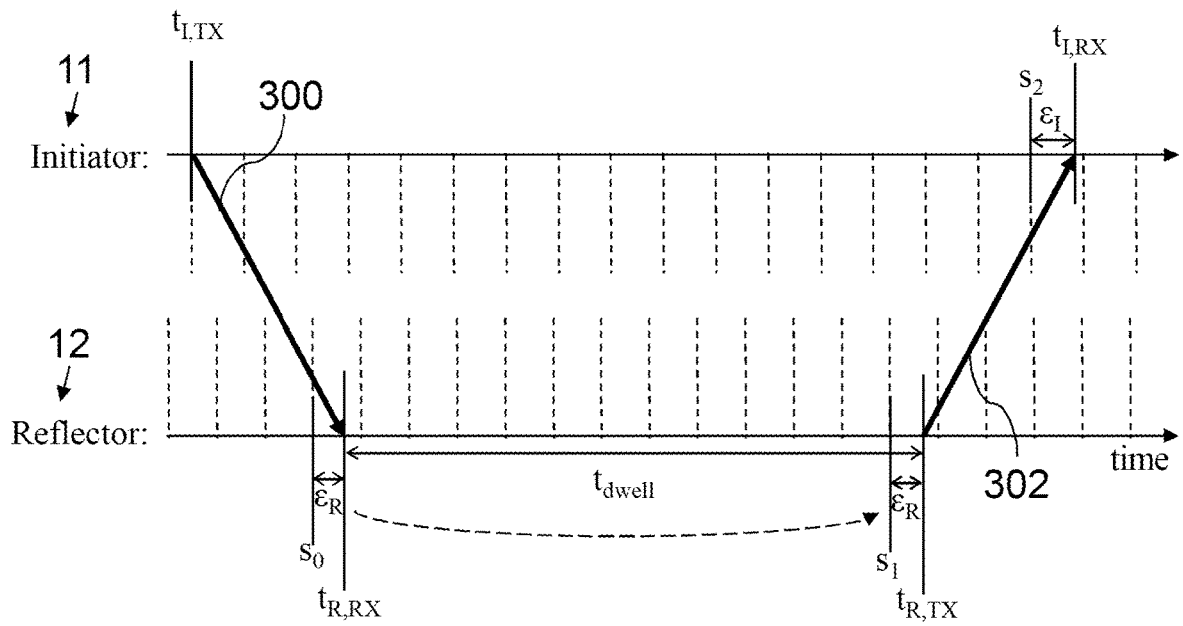
FIG. 4 is a timing diagram giving more detail of how a fractional timing delay is implemented within the system.

FIGS. 3 and 4 show an exemplary radio packet exchange between the initiator device 11 and the reflector device 12 as part of a round-trip timing (RTT) process that enables the initiator 11 to determine an estimate of the separation distance between the respective antennas of the two devices 11, 12.

FIG. 3 provides an overview of the process.

At a time $t_{I,TX}$, the initiator 11 transmits a first radio timing signal 300, which is received by the reflector device 12 at a time $t_{R,RX}$. The difference between $t_{R,RX}$ and $t_{I,TX}$ corresponds to a first time-of-flight period TOF1.

After a dwell time, $t_{dwell}$, at a time, $t_{R,TX}$, the reflector device 12 transmits a second radio timing signal 302, which is received by the initiator device 11 at a time $t_{I,RX}$. The difference between $t_{I,RX}$ and $t_{R,TX}$ corresponds to a second time-of-flight period TOF2.

The total time, T, for the RTT communication exchange satisfies:

$$T = TOF1 + t_{dwell} + TOF2$$

and also $$T = t_{I,RX} - t_{I,TX}$$

An average time-of-flight, TOF, for the two timing signals 300, 302 can therefore be calculated as:

$$TOF = (t_{I,RX} - t_{I,TX} - t_{dwell})/2 \qquad (1)$$

If the dwell time, $t_{dwell}$, is known to the initiator device 11, this TOF value can be calculated by the initiator 11 from $t_{I,RX}$ and $t_{I,TX}$ without it requiring any knowledge of the times $t_{R,RX}$ and $t_{R,TX}$.

By dividing this TOF value by a known speed of the radio signals 300, 302 between the two devices—e.g. the speed of light in air, o—the initiator 11 can, if required, obtain a measurement of the average separation distance between the two devices during the RTT operation. If the devices 11, 12 are stationary, or if the dwell time, tauten, is sufficiently short as to be able to discount any relative motion between them, then TOF1=TOF2 and this average value will simply equal the separation distance.

The RTT exchange can be repeated a few times, and the resulting TOF values averaged, to reduce noise.

In this way, by using a constant predetermined dwell time, tauten, known in advance to the initiator 11, in the RTT process, the initiator 11 can obtain an estimate of the separation distance between the two devices without a need for the reflector 12 to send any timing data to the initiator 11. The dwell time, $t_{dwell}$, could be negotiated in advance between the devices 11, 12, or it could be fixed, e.g. by an agreed standard or specification to which both devices 11, 12 conform.

However, because the speed of the radio signals 300, 302 through air is so fast, it is not at all straightforward for the reflector 12 to implement a constant dwell time, $t_{dwell}$ of sufficient accuracy to enable accurate distance ranging. In particular, receive and transmit paths of the reflector 12 are timed by a clock that is not synchronised to the initiator 11, and, in a naïve implementation, the precision of the dwell time, $t_{dwell}$, is limited by the sampling period of this clock.

To overcome this problem, embodiments use a fractional delay process, which will now be described with reference to FIG. 4.

FIG. 4 shows the same exemplary RTT signal exchange as in FIG. 3, but includes a first set of regularly-spaced vertical markings representing the sampling period of the radio of the initiator device 11, and a second set of regularly-spaced vertical markings representing the sampling period of the radio of the reflector device 12.

Note that the values of $t_{I,TX}$, $t_{R,RX}$, $t_{I,TX}$, $t_{I,RX}$ and $t_{dwell}$ as used above refer to the actual times of transmission and reception of the radio signals at the antennas 208 of the devices 11, 12 in the analogue domain, whereas they are used below to refer values determined in the digital domain. In practice, these are not necessarily exactly the same as there may be non-trivial delays in the analogue electrical RF signal paths within the devices 11, 12. The initiator 11 may therefore apply correction to the times of transmission and reception that it determines digitally in order to compensate for such delays. The reflector 12 may similarly apply an adjustment to the dwell time that it implements in the digital domain, to account for electrical delays in its analogue transmit and receive paths, so that the over-air radio dwell time has the desired duration. These adjustments may be specified at an accuracy of less than one sample period. The reflector 12 may apply a fractional delay adjustment (alongside the optional frequency-offset compensation also described below) using the fractional delay mechanism described below.

The initiator 11 may be configured so that the time $t_{I,TX}$ is always precisely aligned with the sampling clock of the initiator 11, as in this example. Alternatively, the initiator 11 may be configured to measure $t_{I,TX}$ with a resolution that is finer than the sampling period of its sampling clock signal by applying a fractional delay measurement method to the outgoing digital transmission stream—e.g. by performing an early-late detect peak search on the output of a correlator, or using the Gardner algorithm, or any other appropriate technique.

However, $t_{R,RX}$ will not, in general, be precisely aligned with the sampling clock of the reflector 12. In this example, it is received at an interval ER after the closest preceding sampling clock pulse, $s_0$. The value ER is a fractional offset, as it is less than one sampling period of the reflector sampling clock signal.

The reflector 12 estimates this fractional offset ER using a fractional delay measurement method (e.g. early-late timing recovery, or the Gardner algorithm) and then delays the transmission of the second timing signal 302 after the clock pulse, $s_1$, occurring at the dwell time, $t_{dwell}$, after the pulse $s_0$, by a fractional delay that is equal to the estimated fractional offset value $\varepsilon_R$. In alternative embodiments, it may delay the transmission by a function of this value—e.g. in embodiments that also compensate for clock timing drift as described below, or to compensate for known delays in the analogue electrical signal path, or in cases where the predetermined dwell time is not an integer multiple of the nominal sampling clock period. In this way, the reflector 12 implements a dwell time with an accuracy that is finer than the period of its sampling clock.

In one set of embodiments, the fractional delay is applied using a fractional delay filter, implemented in software or hardware in the baseband controller 206, in the transmit path of the reflector 12, in front of the GFSK pulse shaping filter. The fractional filter coefficients are set by the baseband controller 206 in dependence on the measure fractional delay ER. The factional filter may be a linear interpolation filter, a windowed-sinc filter, a polynomial interpolation filter, or any other suitable filter. An exemplary interpolation filter is described in more detail below with reference to FIG. 5.

In another set of embodiments, the fractional delay is applied by determining a delayed version of digital sample data for the second timing signal from precomputed template data for the second timing signal, stored in a memory (e.g. system RAM) of the baseband controller 206. Each template may represent part or all of the second timing signal with a different fractional delay. In some embodiments, each template represents the whole second timing signal, and may be calculated beforehand. The version having the closest fractional delay to the required offset (depending on the measured offset ER) is retrieved and used in the modulator (e.g. in a phase-locked loop). In other embodiments, the second timing signal may be calculated on a halfbit-by-halfbit basis using suitable template data—for example, a different template signal element may be used for transmitting the second half of each bit dependent on what bit is to be transmitted next, and a different template signal element may be used for the first half of each bit dependent on what bit was sent immediately previously. This latter approach may be particularly useful when using modulation that exhibits inter-symbol interference, such as Gaussian frequency shift-keying (GFSK).

The time of reception of the second timing signal 302 at the initiator 11, $t_{I,RX}$, will similarly not, in general, be precisely aligned with the sampling clock of the initiator 11. In this example, it is received at an interval $\varepsilon_I$ after the closest preceding sampling clock pulse, $s_2$. The initiator 11 estimates this fractional offset $\varepsilon_I$ (e.g. using early-late timing recovery, or the Gardner algorithm) and thus determines $t_{I,RX}$ with sub-clock-cycle resolution accuracy.

The baseband controller 206 of the initiator device 11 can then evaluate Equation (1) above with all inputs specified at a resolution that is finer than the sampling periods of the two devices 11, 12, and so determine the TOF more accurately than would be possible without the fractional delaying of the second timing signal 302.

Figure 5:
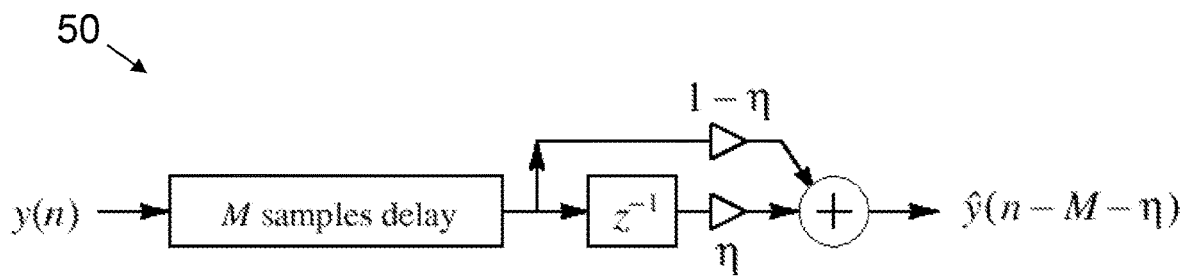
FIG. 5 is a schematic diagram of a fractional delay filter implemented within each radio transceiver.

FIG. 5 is a schematic diagram of an exemplary fractional delay filter that may be implemented within the transmit path by the baseband controller 206 of the reflector device 12 (and also of the initiator device 11, if this device 11 can also assume the role of "reflector" in other RTT operations), to delay the transmission of the second timing signal 302 by an amount ER or by a related amount $\varepsilon_R'$.

The delay filter is an interpolation filter 50. It uses the same 16 MHz frequency clock as the sampling clock signal of the receive and transmit signal paths, but with a significantly higher bandwidth than the signals—e.g. eight times higher. It first imposes a delay of M samples and then calculates the reciprocal 54 of each sample. It buffers the delayed samples by an amount 1−η and delays the reciprocals by an amount η, before adding the two together, where η is determined by $\varepsilon_R$.

FIG. 5 shows the frequency response of this filter 50.

In other example embodiments, the fractional delay filter may be implemented as a windowed sinc filter.

Starting with the system function $H(z)=z^{-D}$, $D=D_{fix}+\tau$, the ideal frequency response $H_{id}(\omega,\tau)=e^{-j\omega(D_{fix}+\tau)}$, with unity magnitude response and phase delay $\tau_{phase,id}(\omega,\tau)=D$. Here, D is the total delay; $D_{fix}$ is the integer delay; $\tau$ is the fractional delay; and $\omega$ is the angular frequency $2\cdot\pi\cdot f$ where f=0 is the centre frequency of the baseband version of the signal.

Applying the inverse discrete Fourier transform (IDFT) gives the ideal time-domain function $h_{id}(n,\tau)=\text{sinc}(n-D)$. This infinite length impulse response is in turn truncated by applying an appropriate window, which gives an approximation to the ideal response.

A simple approximation can be obtained by only looking at a limited part of the passband[0, $\alpha\pi$], which gives: $h_{FIR}(n, \tau) = \begin{cases} \alpha\text{sinc}(\alpha(n-D)), & 0 \leq n < N \\ 0, & \text{otherwise} \end{cases}$.

Figure 6:
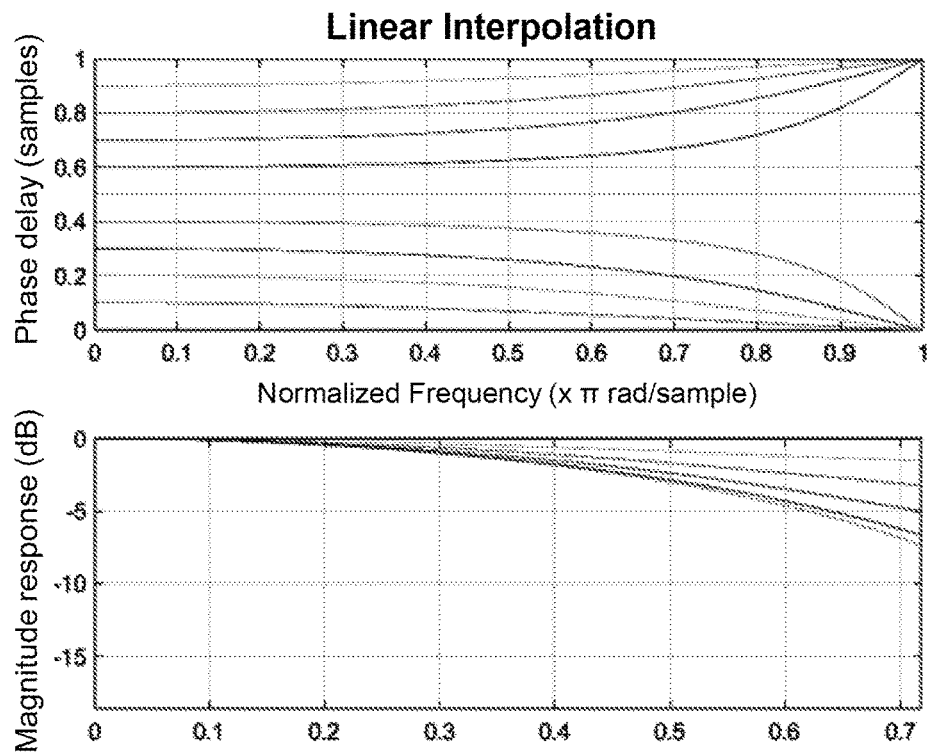
FIG. 6 is a pair of aligned graphs of phase delay and magnitude response against normalized frequency for a linear interpolation fractional delay filter in a first set of embodiments.
Figure 7:
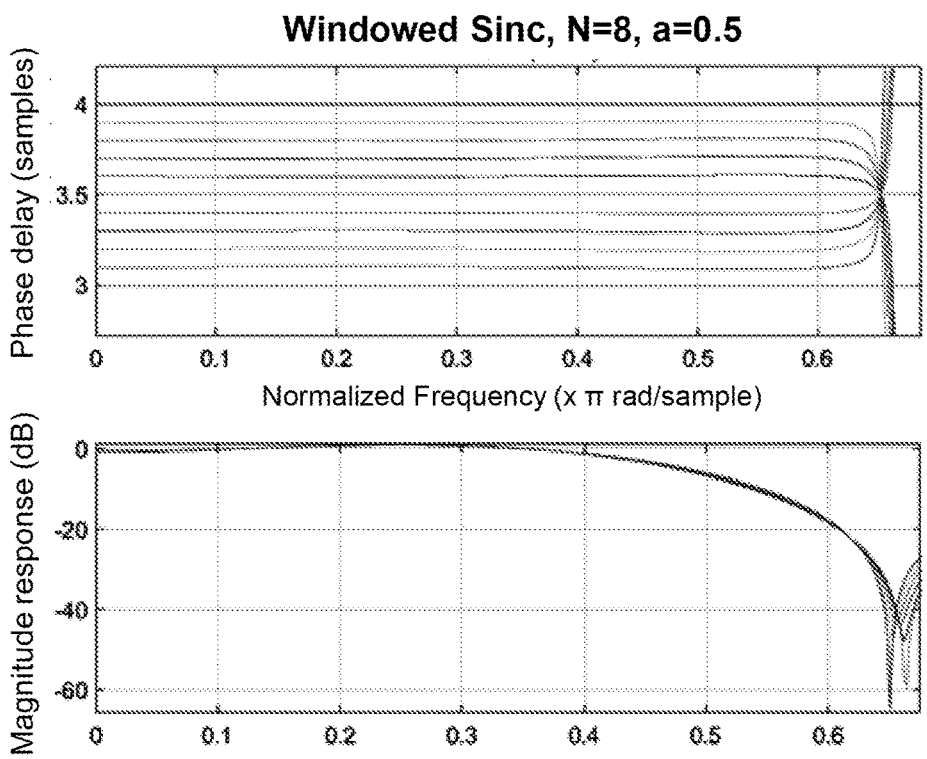
FIG. 7 is a pair of aligned graphs of phase delay and magnitude response against normalized frequency for a windowed sinc fractional delay filter in a second set of embodiments.

FIG. 6 shows the frequency response of such a windowed sinc filter, with N=8, $\alpha$=0.5 and $D_{fix}$=3.

The sampling clocks in the initiator 11 and reflector 12 may have the same nominal frequency, although this is not essential. However, they have an unknown phase offset, and, in practice, may drift relative to each other. Their frequencies could differ by as much as 100 ppm in a BLE system. This means that during the dwell time, $t_{dwell}$ (which is the dominant timespan in the RTT process), the experienced clock drift could be significant. The clock pulse markings in FIG. 4 show a frequency offset between the initiator 11 and reflector 12 (to an exaggerated degree) to illustrate this possibility.

In some embodiments, the accuracy of the TOF distance measurement may be further improved by compensating for any frequency offset, determined using symbol timing frequency estimation.

In some embodiments, the phase of the peak of a complex double correlator, located in the receive path of the reflector 12, which cross-correlates the incoming received radio signal, and time-delayed copy of the received signal, against a stored modulated sequence, may be processed to determine the RF frequency of the device. The phase of the peak in the noise-free case has a phase of $2\pi\cdot\Delta f\cdot T$ where $\Delta f$ is the frequency offset and T is the time delay used in the double correlator. In embodiments in which the sampling clock and local oscillator (LO) 214 are tied together, the fractional frequency offset of the sampling clock can be calculated by the baseband controller 206 as $\Delta v=\Delta f/f$ where f is the desired LO frequency, and where a positive $\Delta v$ indicates that the initiator clock is faster than the reflector clock.

An alternative method may employ a frequency estimate based on a continuous tone signal, with a frequency estimate being obtained by applying linear regression to the unwrapped phase of the signal with respect to time. The slope of this line is given by $2\pi\cdot\Delta f$, from which $\Delta v$ can be calculated.

Rather than simply equalling $\varepsilon_R$, the fractional delay applied to the second timing signal 302 by the reflector 12 may then be adjusted to compensate for the fractional frequency offset $\Delta v$ using the following relationship:

$$\varepsilon_R' = \varepsilon_R - \left(t_{dwell} - \frac{t_{dwell}}{1+\Delta v}\right) = \varepsilon_R - t_{dwell}\frac{\Delta v}{1+\Delta v}$$

For example, if $\Delta v$=100 ppm and $t_{dwell}$=150 μs, then $$\left(t_{dwell}\frac{\Delta v}{1+\Delta v}\right) = 15.0 \text{ ns}.$$

Assuming the reflector 12 uses a sampling clock rate of 16 MHz, then $\varepsilon_R'=\varepsilon_R-15$ ns. Since 15 ns corresponds to approximately 5 metres of travel time this is an important additional correction if it is desired to obtain a ranging accuracy of under 1 metre.

This variable adjustment to ER to account for clock timing drift, may be applied in addition to a constant adjustment to ER to account for any known constant delays in the analogue transmit and receive paths of the reflector 12, as already described above.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method for determining a distance between an initiator radio transceiver and a reflector radio transceiver, the method comprising:
   the reflector radio transceiver determining a frequency offset of a sampling clock signal from one or more radio signals received by the reflector radio transceiver, and determining an adjustment factor in dependence on the determined frequency offset;
   the initiator radio transceiver transmitting a first radio signal at a first transmission time;
   the reflector radio transceiver:
      receiving the first radio signal at a first reception time;
      generating an electrical signal representative of the received first radio signal;
      generating a sampled signal by sampling the electrical signal using the sampling clock signal;
      processing the sampled signal to determine a first reception-time value, representative of the first reception time, at a temporal resolution that is finer than a sampling period of the sampling clock signal, whereby the first reception-time value comprises a fractional component representative of a fraction of the sampling period; and using the fractional component and the adjustment factor to transmit a second radio signal at a second transmission time that follows a pulse of the sampling clock signal by an offset amount that is equal to said fractional component plus the adjustment factor, such that the second transmission time is delayed from the first reception time by a predetermined dwell time that is determined to an accuracy finer than the sampling period; and the initiator radio transceiver:
receiving the second radio signal at a second reception time;
determining a second reception-time value representative of the second reception time; and
processing the second reception-time value and a first transmission-time value representative of said first transmission time to determine a distance value representative of a distance between the initiator radio transceiver and the reflector radio transceiver.

2. The method of claim 1, wherein the first and second radio signals are in a 2.4 GHz band.

3. A reflector radio transceiver for use in a method for determining a distance between an initiator radio transceiver and the reflector radio transceiver, wherein the reflector radio transceiver is configured to:
determine a frequency offset of a sampling clock signal from one or more radio signals received by the reflector radio transceiver, and determine an adjustment factor in dependence on the determined frequency offset;
receive a first radio signal from the initiator radio transceiver at a first reception time;
generate an electrical signal representative of the received first radio signal;
generate a sampled signal by sampling the electrical signal using the sampling clock signal;
process the sampled signal to determine a first reception-time value, representative of the first reception time, at a temporal resolution that is finer than a sampling period of the sampling clock signal, whereby the first reception-time value comprises a fractional component representative of a fraction of the sampling period; and
use the fractional component and the adjustment factor to transmit a second radio signal at a second transmission time that follows a pulse of the sampling clock signal by an offset amount that is equal to said fractional component plus the adjustment factor, such that the second transmission time is delayed from the first reception time by a predetermined dwell time that is determined to an accuracy finer than the sampling period.

4. The reflector radio transceiver of claim 3, comprising a digital-to-analog converter that is clocked by the sampling clock signal, for sampling radio signals received by the reflector radio transceiver, and an analog-to-digital converter that is clocked by the sampling clock signal, for converting digital signals to analog signals for transmission as radio signals by the reflector radio transceiver.

5. The reflector radio transceiver of claim 3, comprising a digital correlator configured to cross-correlate the sampled signal with reference data representative of the first timing signal, wherein the reflector radio transceiver is configured to process an output of the digital correlator using a timing-offset determination method to determine the first reception-time value.

6. The reflector radio transceiver of claim 3, configured to store the first reception-time value, including the fractional component, as data in a memory of the reflector radio transceiver.

7. The reflector radio transceiver of claim 3, comprising a fractional delay filter for introducing a delay to the transmission of the second radio signal of less than one sampling period.

8. The reflector radio transceiver of claim 7, configured to control the fractional delay filter to implement a delay that is equal to the fractional component or that is a predetermined function of the fractional component.

9. The reflector radio transceiver of claim 3, comprising a memory for storing a digital signal template data, representing part or all of the second radio signal at a plurality of different fractional delays, wherein the reflector radio transceiver is configured to select template data from the memory in dependence on the factional component and to use the selected template data for transmitting the second radio signal.

10. The reflector radio transceiver of claim 9, wherein the respective fractional delays are spaced at equal intervals over one sampling period.

11. The reflector radio transceiver of claim 3, wherein the second transmission time follows a pulse of the clock signal by an offset amount equal to the fractional component.

12. The reflector radio transceiver of claim 3, wherein the second transmission time follows a pulse of the clock signal by an offset amount equal to the fractional component plus a constant adjustment factor.

13. The reflector radio transceiver of claim 3, comprising a local oscillator for down-mixing received radio-frequency signals, wherein the local oscillator is synchronized with the sampling clock signal, and wherein the reflector radio transceiver is configured to determine the frequency offset of the sampling clock by determining a frequency offset between the local oscillator and a received radio signal.

14. The reflector radio transceiver of claim 3, wherein the first and second radio signals are respective modulated digital signals comprising a respective modulated pseudorandom sequence.

15. The reflector radio transceiver of claim 3, configured to support a version of the Bluetooth™ Low Energy protocol.

16. A radio system comprising an initiator radio transceiver and the reflector radio transceiver of claim 3, wherein:
the initiator radio transceiver is configured to transmit said first radio signal at a first transmission time; and
the initiator radio transceiver is further configured to:
receive the second radio signal at a second reception time;
determine a second reception-time value representative of the second reception time; and
process the second reception-time value and a first transmission-time value representative of said first transmission time to determine a distance value representative of a distance between the initiator radio transceiver and the reflector radio transceiver.

17. The radio system of claim 16, wherein the initiator radio transceiver is further configured to:
determine the first transmission-time value at a temporal resolution that is finer than the second sampling period;
generate a second electrical signal representative of the received second radio signal;

generate a second sampled signal by sampling the second electrical signal using a second sampling clock signal having a second sampling period; and determine the second reception-time value at a temporal resolution that is finer than the second sampling period, whereby the second reception-time value comprises a fractional component representative of a fraction of the second sampling period.

18. The radio system of claim 16, wherein the initiator radio transceiver is configured to determine the distance value as the difference between i) the second reception-time value, and ii) the first transmission-time value plus the predetermined dwell time, multiplied by a signal-speed value and divided by two.

19. A non-transitory computer-readable storage medium comprising instructions that, when executed by a processing system of a reflector radio transceiver, cause the processing system to:

receive a sampled signal representative of a received first radio signal received by the reflector radio transceiver at a first reception time, wherein the sampled signal is sampled according to a sampling clock signal having a sampling period;

process the sampled signal to determine a first reception-time value, representative of the first reception time, at a temporal resolution that is finer than the sampling period, whereby the first reception-time value comprises a fractional component representative of a fraction of the sampling period;

determine an adjustment factor in dependence on a frequency offset of the sampling clock signal; and use the fractional component and the adjustment factor to control the reflector radio transceiver to transmit a second radio signal at a second transmission time that follows a pulse of the sampling clock signal by an amount that is equal to said fractional component plus the adjustment factor, such that the second transmission time is delayed from the first reception time by a predetermined dwell time that is determined to an accuracy finer than the sampling period.

* * * * *